United States Patent [19]

Ruigrok et al.

[11] Patent Number: 5,153,798
[45] Date of Patent: Oct. 6, 1992

[54] MAGNETIC HEAD INCLUDING A CORE HAVING A NON-MAGNETIC GAP

[75] Inventors: Jacobus J. M. Ruigrok; Victor Zieren, both of Eindhoven, Netherlands

[73] Assignee: U.S. Philips Corp., New York, N.Y.

[21] Appl. No.: 842,794

[22] Filed: Feb. 27, 1992

Related U.S. Application Data

[63] Continuation of Ser. No. 664,422, Mar. 4, 1991, which is a continuation of Ser. No. 523,187, May 4, 1990, which is a continuation of Ser. No. 218,014, Jul. 12, 1988, abandoned.

[30] Foreign Application Priority Data

Jul. 15, 1987 [NL] Netherlands ............ 8701666

[51] Int. Cl.$^5$ .............. G11B 5/235; G11B 5/187
[52] U.S. Cl. .................... 360/120; 505/826; 360/122
[58] Field of Search ............ 360/120, 122, 110

[56] References Cited

U.S. PATENT DOCUMENTS

| | | | |
|---|---|---|---|
| 3,686,467 | 8/1972 | Camras | 360/119 X |
| 4,713,710 | 12/1987 | Soda et al. | 360/129 X |
| 4,745,505 | 5/1988 | Peeters et al. | 360/119 X |
| 4,757,411 | 7/1988 | Matsunaga | 360/129 |
| 4,907,115 | 3/1990 | Ruigrok et al. | 360/113 |

FOREIGN PATENT DOCUMENTS

| | | | |
|---|---|---|---|
| 57-120221 | 7/1982 | Japan | 360/120 |
| 60-154315 | 8/1985 | Japan | 360/120 |

OTHER PUBLICATIONS

"Superconductors" by A. Ellis, Journal of Chemical Education, pp. 836-841, vol. 64, No. 10, Oct. 1987.

*Primary Examiner*—John H. Wolff
*Attorney, Agent, or Firm*—William L. Botjer

[57] ABSTRACT

Magnetic head including a core (1, 3) of soft magnetic material having a contact face (7) and a winding aperture (5) and a coil (14) wound around the core. A layer (13) of a superconducting material is present in the non-magnetic transducing gap (11) in the core and a layer (15) of a superconducting material is provided on at least a plurality of the outer faces, for example the side faces (17).

8 Claims, 1 Drawing Sheet

MAGNETIC HEAD INCLUDING A CORE HAVING A NON-MAGNETIC GAP

This is a continuation of application Ser. No. 07/664,422, filed Mar. 4, 1991 which is a continuation of application Ser. No. 07/523,187, filed May 14, 1990 which is a continuation of application Ser. No. 07/218,014, filed Jul. 12, 1988, now abandoned.

BACKGROUND OF THE INVENTION

The invention relates to a magnetic head for recording, reproducing and/or erasing magnetic information in a track of a magnetic record carrier. A core of soft-magnetic material has outer faces of which one is a contact face, and inner faces bounding a winding aperture. A non-magnetic transducing gap ends at the contact face and at least one electric coil passing through the winding aperture is wound around the core.

A magnetic head of this type is generally known and is described, for example in U.S. Pat. No. 4,745,505, herein incorporated by reference. The known conventional magnetic head has a core which is composed of two soft-magnetic core limbs between which the transducing gap is defined. A drawback of this conventional magnetic head is its comparatively low efficiency, if the magnetic head is used for reproducing and/or recording information having high densities because a short gap is to be used to achieve the required high resolution. In another type of conventional magnetic head in which an amorphous metal alloy preferably having a thickness which is universally equal to the gap width is used, the occurring stray flux has a considerable detrimental influence on the efficiency if a small gap width and gap length are used in connection with the high information densities. The Japanese Patent Application 60-154315 describes a magnetic head in which it has been proposed to provide a superconductor in the transducing gap to increase the efficiency.

SUMMARY OF THE INVENTION

A layer of a superconducting material is provided on at least a plurality of the outer faces of the core. Narrow zones of the contact face adjacent the transducing gap are not clad with the superconducting material. A superconducting material is herein understood to mean a material which is in a superconducting state and exhibits the full or substantially full Meissner effect. For practical reasons materials are preferred which have a relatively high critical temperature, for example above the temperature at which nitrogen liquefies at normal pressure. Suitable materials are, for example ceramic materials formed from compounds consisting of lanthanum, barium, copper and oxygen such as $La_{1-x}Ba_xCuO_x$ with x between 0.15 and 0.6; lanthanum, strontium, copper and oxygen such as $La_{2-x}Sr_xCuO_4$ with x between 0.15 and 0.2; yttrium, barium, copper and oxygen such as $YBa_2Cu_3O_{7-d}$ with d between 0.0 and 1.0 or $Y_{0.4}Ba_{0.6}Cu_{1.0}O_{3.0}$; or yttrium, barium, strontium, copper and oxygen such as $YBa_{2-x}Sr_xCu_3O_8$ in which a part of the elements may be partly substituted, for example oxygen by fluorine or strontium by calcium.

The layer of superconducting material provided on the outer faces prevents the escape of magnetic flux at the area where the superconducting material is present. When using the magnetic head as a write head, a larger flux density and consequently a stronger magnetic write field can be achieved on the contact face at the area of the transducing gap in the case of a given current through the coil. The magnetic head according to the invention, in which a layer of a superconducting material is preferably provided in the transducing gap, is therefore particularly suitable for recording information on magnetic recording media having a high coercive force such as MP magnetic tapes based on Fe. When using the magnetic head according to the invention as a read head, the inhibition of magnetic loss flux of course has a favourable influence on the transducing function of the read head. In summary it can be noted that the measures contribute essentially to the aim of improving the write and read efficiency of the conventional magnetic heads.

An additional, but important result is that the magnetic inductance of the magnetic head may be small as compared with the known magnetic heads, because the stray flux on which, as is assumed to be known, the inductance is also dependent can be inhibited to a considerable extent. A small inductance is favourable for achieving a high signal-to-noise ratio. The outer faces (side faces) of the core extending on either side of the transducing gap may be clad with a superconducting material. This embodiment has the advantage that a large effect can be achieved with few handling operations by cladding the relatively large side faces. A layer of a superconducting material also may be provided on at least a plurality of the inner faces of the core.

By cladding both the outer faces and the inner faces of the core with a layer of a superconducting material, the occurrence of magnetic stray flux can be substantially suppressed. It is to be noted that for preventing unwanted electric circuit currents in the complete superconducting cladding provided on the core at least certain parts of the outer faces and/or inner faces should not be clad, that is to say, they should be free from superconducting material. To this end, for example an uninterrupted narrow strip encircling the winding aperture on one of the side faces of the core may be used. The coil parts of the said electric coil extending along the outer faces and/or inner faces may also be at least partly clad with a superconducting material. This embodiment has the advantage that the magnetic stray flux from the coil can be reduced considerably. The electric coil itself may be made of a superconducting material. This embodiment utilizes the phenomenon that the electrical resistance of a material in a superconducting state is zero or substantially zero. In this embodiment a considerable reduction of the electrical resistance of the coil and therefore a reduction of thermal noise can be achieved.

It is to be noted that DE-A 1,522,971 describes a method of increasing the dynamic range and improving the signal-to-noise ratio in electromagnetic tape recordings by means of a sound head having an oblique gap. To this end the sound head is locally provided with a diamagnetic material so as to intensify the magnetic field lines on the gap and to obviate a too large stray field on the gap. However, the inductive magnetic heads shown in the Figures of DE-A 1,522,971 and obtained in accordance with the method described have such a shape and composition that they inhibit stray flux only at those locations where the stray flux is already small and does not exert much influence on the sensitivity of the magnetic heads. Therefore, as far as the efficiency of the magnetic heads shown is concerned, it does not make much difference whether the diamagnetic material is provided or not. The gaps of the magnetic heads shown have lengths which are also defined by parts of the diamagnetic material provided and are constant over a small gap height. This means that the gap length will vary very rapidly during operation, which is due to wear of the tape contact faces of the magnetic heads and will thus result in a short life of the heads.

The magnetic heads according to the invention are suitable for writing and reading magnetic media with high coercive forces.

DETAILED DESCRIPTION OF THE PREFERRED EMBODIMENT

Figure 1:
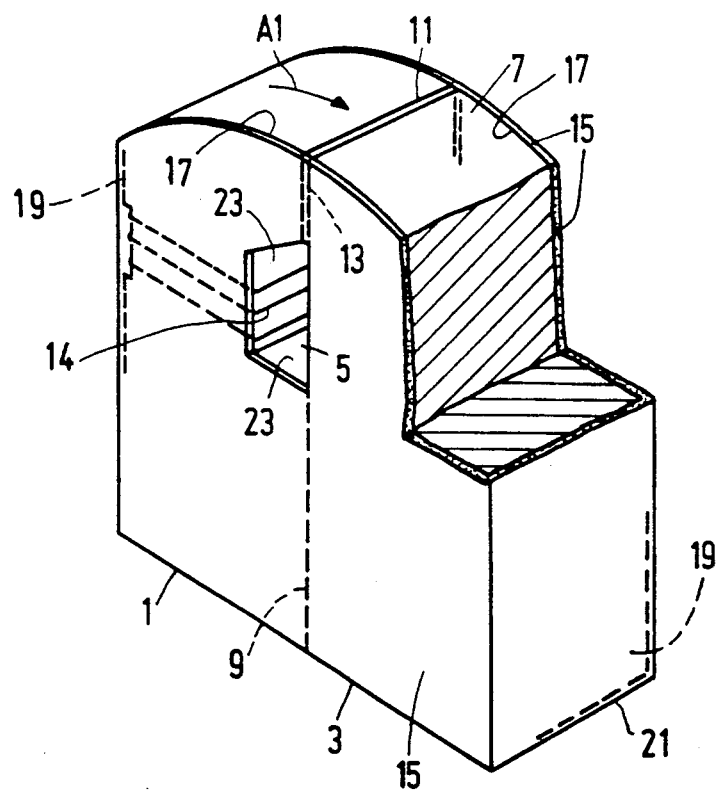
FIG. 1 is a diagrammatic elevational view of a first embodiment of the magnetic head according to the invention.

The magnetic head shown in FIG. 1 has a magnetic core consisting of two core limbs 1 and 3, whilst a groove constituting a winding aperture 5 is provided in the core limb 1. The core limbs 1 and 3 are formed from a ferrite, for example a mono-crystalline Mn-Zn ferrite and together they constitute a contact face 7 on which during operation of the magnetic head a magnetic tape (not shown) is moved in the direction of the arrow A1. A non-magnetic gap 11 extending from the winding aperture 5 up to the contact face 7 is provided between the core limbs 1 and 3 which are bonded together in an area 9 by means of a bonding material such as glass. An electric coil 14 passing through the winding aperture 5 is wound around the core limb 1, whilst its ends (not shown) can be connected to a suitable circuit arrangement.

The gap 11 may be composed of one or more layers of a non-magnetic material and will preferably comprise a layer 13 of a superconducting material, for example one of the superconducting materials mentioned hereinbefore.

In the embodiment of FIG. 1 the magnetic head according to the invention has a layer 15 of a superconducting material such as $YBa_2Cu_3O_{7-d}$ which is provided on two side faces 17, two end faces 19 and a base face 21. The contact face 7 mentioned hereinbefore is not clad. The layers 15 are also provided on the parts of the coil 14 extending along the outer faces 15 and 19. No superconducting material is provided on the inner faces 23 of the magnetic head bounding the winding aperture 5.

The layers 13 and 15 of a superconducting material may be provided by means of known techniques such as sputtering, vapour deposition or electro-deposition.

Figure 2:
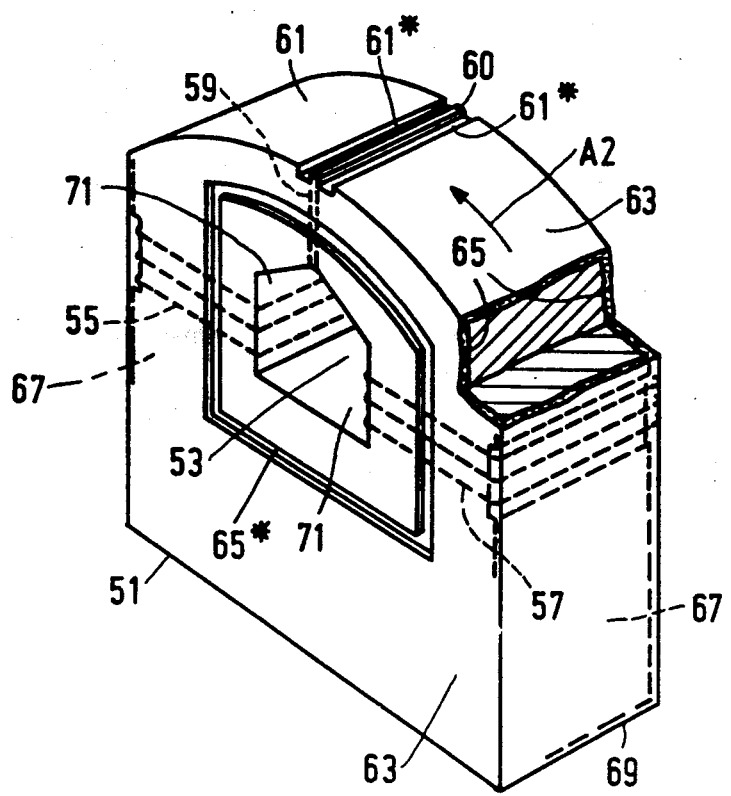
FIG. 2 is a diagrammatic elevational view of a second embodiment.

The magnetic head shown in FIG. 2 is a modification of the embodiment of FIG. 1 and has a core 51 with a winding aperture 53 through which two electric coils 55 and 57 wound around the core are provided. A non-magnetic transducing gap 59 preferably comprising a layer 60 of a superconducting material is provided in the core 51 which is made from a ferrite. The transducing gap 59 terminates on a contact face 61 of the magnetic head, which face is used to guide a magnetic tape, for example in a direction in accordance with the arrow A2.

With the exception of some small areas, the magnetic head of FIG. 2 is entirely clad with a layer 63 of a superconducting material. This means that the layer 63 is provided on the outer surfaces constituted by two side faces 65, two end faces 67, a base face 69 and the contact face 61 and on inner faces 71 of the magnetic head encircling the winding aperture 53. However, to prevent unwanted circuit currents in the provided cladding of the superconducting material an uninterrupted narrow zone 65A on one of the side faces 65 is not clad. For forming the desired strong magnetic field near the gap 59 a narrow zone 61A on either side of the superconducting layer 60 is not clad. A strong satisfactorily localized magnetic field may emerge through these narrow zones from the contact face, which field has a considerably larger value than the saturation magnetization of the material used for the core.

It is to be noted that the electric coils 14 and 55, 57 of the embodiment of FIGS. 1 and 2, respectively, are made of an electrically conducting material such as copper or, if very high quality requirements are imposed on the magnetic head, of a suitable superconducting material.

The invention is of course not limited to the embodiments shown. For many uses it will already be sufficient if only the side faces of the magnetic heads are clad with a layer of a superconducting material.

We claim:

1. A magnetic head for recording, reproducing and/or erasing magnetic information in a track of magnetic recording carrier, comprising:
   a core of a soft-magnetic material having outer faces which include a contact face for engagement with the magnetic recording carrier, two side faces disposed along the direction of movement of the recording carrier, a base face disposed opposite said contact face and two end faces disposed perpendicular to the movement of the recording carrier
   a non magnetic transducting gap terminating in the contact face, and
   at least one electric coil passing through the winding aperture and being wound around the core, characterized in that a layer of a superconducting material is provided on at least two of the side, end and base faces of the core, while at least a portion disposed adjacent to the transducing gap, of the contact face is free from cladding with the superconducting material.

2. A magnetic head as claimed in claim 1, characterized in that at least the side faces of the core extending on either side of the transducing gap are clad with a superconducting material.

3. A magnetic head as claimed in claim 1, characterized in that a layer of a superconducting material is provided on at least plurality two of the inner faces of the core surrounding the winding aperture.

4. A magnetic head as claimed in claim 1, characterized in that portions of the coil extending along the outer faces and inner faces are at least partly clad with a superconducting material.

5. A magnetic head as in claim 1 wherein the electric coil is made of a superconducting material.

6. A magnetic head as in claim 1 wherein a superconducting material is provided in the transducing gap.

7. A magnetic head as claimed in claim 1, wherein said contact surface is covered with superconducting material except along a line adjacent said transducing gap.

8. A magnetic head as claimed in claim 1, wherein the side faces of the head are clad with superconducting material, one of said side faces including a gap in the superconducting material circumscribing said winding aperture and being spaced apart therefrom.

* * * * *